United States Patent [19]

Fasnacht

[11] 4,193,258
[45] Mar. 18, 1980

[54] CHAIN SHACKLE

[76] Inventor: Adam F. Fasnacht, 19832 Alana Rd., Castro Valley, Calif. 94546

[21] Appl. No.: 926,885

[22] Filed: Jul. 21, 1978

[51] Int. Cl.² ............................................. F16G 15/02
[52] U.S. Cl. ............................................. 59/86; 59/93
[58] Field of Search .................. 59/93, 85, 86, 87, 88, 59/93, 78, 84; 24/201 L; 114/114

[56] References Cited

U.S. PATENT DOCUMENTS

| 333,095 | 12/1885 | Munro | 59/85 |
|---|---|---|---|
| 754,521 | 3/1904 | Vale | 59/89 |
| 1,118,657 | 11/1914 | Laughlin | 59/87 |
| 1,358,108 | 11/1920 | Powell | 59/87 |
| 1,454,335 | 5/1923 | Prendergast | 59/85 |
| 1,979,069 | 10/1934 | Hancock | 59/88 |
| 2,287,913 | 6/1942 | Pierre | 59/87 |

FOREIGN PATENT DOCUMENTS 82730 11/1953 Norway ........................................ 59/86

Primary Examiner—Francis S. Husar
Assistant Examiner—Gene P. Crosby

[57] ABSTRACT

This shackle consists primarily of a pair of "U"-shaped members, a leg of each threading into each other, so as to form a pivotal joint, which enables the shackle to be easily applied to a chain, even under adverse conditions. The shackle further includes a tapered clincher head pin, and the opening in a mating clincher head is tapered at the bottom and countersunk at the top, so as to allow swedging of the pin therein.

2 Claims, 3 Drawing Figures

CHAIN SHACKLE

This invention relates to chains, and more particularly, to a chain shackle.

It is, therefore, the principal object of this invention to provide a chain shackle, which can be quickly installed on a chain under adverse conditions.

Another object of this invention is to provide a chain shackle, which will be of such structure, so as to have sufficient strength, while simultaneously being easy to install.

A further object of this invention is to provide a chain shackle, which will have a tapered clincher head pin, which may be readily swedged into a countersunk opening in the clincher head.

Other objects of the invention are to provide a chain shackle, which will be inexpensive to manufacture, rugged in construction, and easy to install.

These, and other objects of the invention, will become readily evident, upon a study of the specification, and the accompanying drawing, in which.

Figure 1:
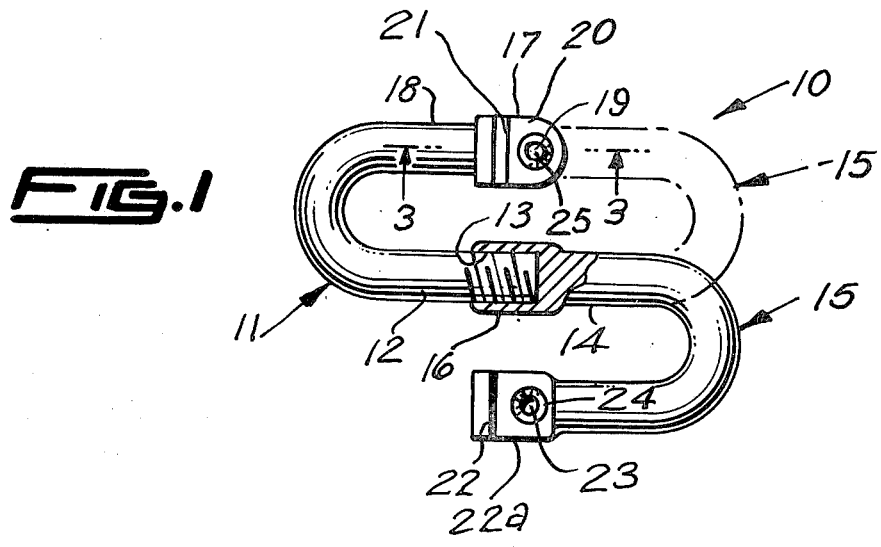
FIG. 1 is a plan view of the present invention, shown in open position, and partly broken away, with the closed position shown in phantom lines.
Figure 2:
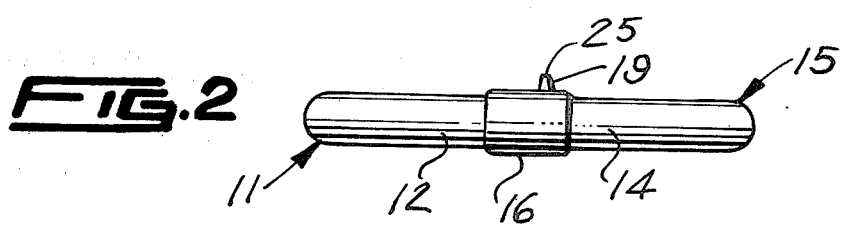
FIG. 2 is a side view of FIG. 1, shown in the closed position, and in elevation.
Figure 3:
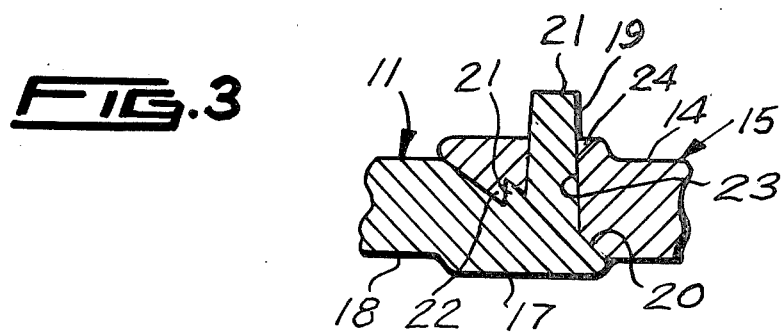
FIG. 3 is an enlarged cross-sectional view, taken along the line 3—3 of FIG. 1, and shows the engagement of the locking heads of the device.

According to this invention, shackle 10 is shown to include a "U"-shaped member 11, the leg 12 being threaded, and received within the opening 13, in the end of leg 14 of "U"-shaped member 15. The aforementioned combination forms a pivotal joint 16. The head 17 of leg 18, of "U"-shaped member 11, is provided with a clinching pin 19 of tapered configuration, for a purpose which hereinafter will be described.

Clincher head pin 19 extends from the angularly disposed face 20 of head 17, prior to being swedged. A tooth 21 is formed of face 20, on one side of clincher head pin 19, so as to engage tooth 22 of head 22a. The tapered opening 23 receives clincher head pin 19, and the counter-sunk opening 24 enables the end 25 of pin 19 to be swedged therein.

It shall be noted, that there is little sacrificing of strength in either of joints of the shackle, and the end pockets are uncumbered, thus providing for easy manufacturing thereof.

While various changes may be made in the detail construction, it is understood that such changes will be within the spirit and scope of the present intervention, as defined by the appended claims.

I claim:

1. A chain shackle, comprising a pair of "U"-shaped members, which are pivotal on each other, one of said members having tooth and clincher pin means, and the other of said members having tooth and opening means, for locking said chain shackle to a chain; one of said pair of "U"-shaped members being threaded on the outer periphery of one leg, and being rotatably received within a threaded end of the other of said pair of "U"-shaped members, which forms a pivotal joint, and said "U"-shaped member having said externally threaded end, being provided with a head on its opposite leg having said tooth and clincher pin means.

2. The combination according to claim 1 wherein said other of said pair of "U"-shaped members having said tooth and opening means is likewise provided with a head on the same end as said tooth and opening and said tooth and clincher pin means comprises a means for locking said heads of said pair of "U"-shaped members together, said clincher pin being fixedly connected to, and extending from, an angularly disposed face of the head on the same leg of said "U"-shaped member opposite the leg that is externally threaded; a base of said clincher pin means being larger in diameter than its extending end, and said tooth means being disposed outwardly from a side of the said base of said clincher pin means, and is an extension of said face of said head.

* * * * *